United States Patent [19]

Simon

[11] 4,054,055

[45] Oct. 18, 1977

[54] DEVICE FOR CONTROLLING THE LOAD OF A LIFTING APPLIANCE

[75] Inventor: François Simon, Gresy-sur-Aix, France

[73] Assignee: Precilec, Paris, France

[21] Appl. No.: 712,370

[22] Filed: Aug. 6, 1976

[51] Int. Cl.² .................. G01L 3/00; G08B 21/00
[52] U.S. Cl. .................. 73/133 R; 340/267 C
[58] Field of Search .......... 340/267 C; 212/39 A, 212/39 MS; 116/124 F; 73/133 R

[56] References Cited

U.S. PATENT DOCUMENTS

| 3,833,932 | 9/1974 | Hamilton | 340/267 C |
| 3,854,128 | 12/1974 | Yamagishi | 340/267 C |
| 3,870,160 | 3/1975 | Hutchings | 340/267 C |

Primary Examiner—James J. Gill
Assistant Examiner—Anthony V. Ciarlante
Attorney, Agent, or Firm—Toren, McGeady and Stanger

[57] ABSTRACT

The invention provides a device for indicating the maximum permissible loads of a lifting appliance wherein a series of potentiometers are adjusted according to the variation of one parameter and control another potentiometer which is adjusted according to a second parameter, and means for assigning reference voltages to the series of potentiometers which means comprise, for each tapping, a series of polarisation circuits in parallel, each circuit providing a regulated voltage and controlled by a switch defining the instantaneous position of operation and simultaneously controlling all the polarisation circuits.

3 Claims, 6 Drawing Figures

DEVICE FOR CONTROLLING THE LOAD OF A LIFTING APPLIANCE

BACKGROUND TO THE INVENTION

The invention relates to a device for enabling the load of a lifting appliance to be controlled.

During use of the lifting appliance it is desirable, if not imposed by the regulations, to know at any time if the load which is actually applied reaches a limiting value or not, determined, for example, by the manufacturer as a function of the geometrical characteristics of the appliance, the position of the point of application of the load, the conditions of operation, and the mechanical strength of the parts of the appliance.

In general, the manufacturer supplies with the appliance charts indicating the maximum authorised loads as a function of various geometric parameters of the appliance, for example the radius, and as a function of the conditions of operation, such as whether, in the case of an appliance on wheels, it rests on these wheels or is supported by outriggers.

It has already been proposed to measure the load actually raised by the appliance and to compare it with the limiting value, with a view to giving an alarm signal and/or stopping the machine from operating if this limiting value is reached or exceeded.

However, these previous devices present various disadvantages. In fact, they are difficult to use, particularly because of the movements which the operator has to carry out. They are not reliable because of their too great sensitivity to external conditions, they are fragile because of their complexity, they are costly, and they are not applicable to various types of appliance without modification of the appliances of the devices themselves.

SUMMARY OF THE INVENTION

It has been proposed to use two potentiometer units, the first formed by a battery of coupled potentiometers, where the positions of the arms of the potentiometers is controlled by the value of a first geometric parameter of the appliance, and the second formed by a potentiometer of which the position of the arm is controlled by the value of a second geometric parameter of the appliance. The second unit potentiometer has multiple tappings, which are respectively electrically connected to the arms of the first unit potentiometers. These latter potentiometers likewise have multiple tappings, which are each fed with a reference voltage. A pre-determined particular value of the first parameter is assigned to each of the series of tappings of the first potentiometers, and pre-determined particular values of the second parameter are assigned to the tappings of the second potentiometer. Each of the first potentiometers is associated with one of the said pre-determined particular values of the second parameter, and its arm is connected to the tapping of the second potentiometer assigned to the said pre-determined particular value of the second parameter.

A pair of pre-determined particular values of the first and second parameters is thus associated with each of the tappings of the first potentiometers. This pair of values represents a geometrical position of the appliance, to which corresponds a maximum permissible load, according to the conditions of operation. This maximum load is represented by a reference voltage which is supplied to the said tapping.

A voltage therefore appears at all times on the arm of the second potentiometer, and, by three linear interpolations, it represents the maximum permissible load for the pair of values of the two parameter under consideration. This voltage is compared to a voltage representing the actual value of the load borne by the appliance, and a comparison signal is given to control the safety device.

The object of this invention is to perfect this type of devices with two potentiometer units, especially as regards the means for establishing the reference voltages applied to the tappings of the first unit potentiometers.

To this effect, the device according to the invention comprises the following;

A first potentiometer unit formed by a series of potentiometers, mechaniclly coupled, with multiple tappings.

First means of controlling the position of the arms of the said potentiometers as a function of the value of a first geometric parameter of the appliance.

A second potentiometer unit formed by a potentiometer with multiple tappings, each of which is electrically connected to the arm of a corresponding first unit potentiometer.

Second means of controlling the position of the arm of the said second unit potentiometer as a function of the value of a second geometric parameter of the appliance.

Third means for assigning reference voltages to the tappings of the first unit potentiometers.

Fourth means for establishing a reference voltage which represents the instantaneous load actually applied to the appliance.

Fifth means of comparison of the voltage taken off the arm of the second unit potentiometer, and the said voltage representing the load applied to the appliance is characterised by the fact that the third means for assigning the reference voltages to the tappings of the first unit potentiometers includes, for each tapping, a system of polarisation comprising a series of polarisation circuits in parallel associated with the situations in which the appliance is brought into operation, each circuit including a member suitable for providing a regulated voltage and controlled by a switching device defining the instantaneous position of operation and simultaneously controlling all the circuits of all the polarisation systems of the tappings of the first unit potentiometers.

BRIEF DESCRIPTION OF THE DRAWINGS:

Other features of the invention will appear on reading the description which follows and by reference to the attached drawings, in which.

Figure 1:
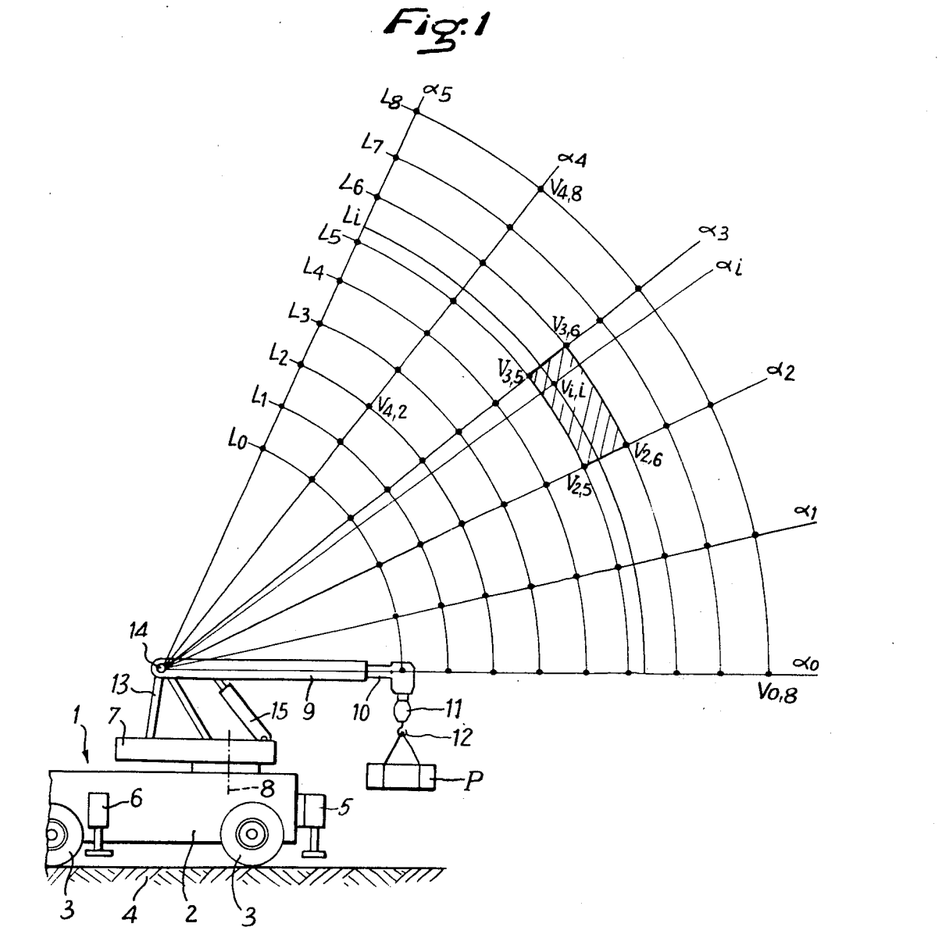
FIG. 1 is a geometrical representation illustrating the arbitrary choice of the pairs of values of two parameters in the application of the invention to a crane with a telescopic jib, mounted on wheels.

FIG. 1 shows diagrammatically and partially a mobile crane 1, of which the chassis 2 is mounted on wheels 3 resting on the ground 4 for movement of the crane. In a known manner, hydraulic rear outriggers 5 and side outriggers 6 can be operated in order to give support from the ground 4 and to reinforce the stability of the crane during the lifting operations.

The chassis 2 carries a turret 7 able to rotate in relation to the chassis around a vertical axis 8 under the action of means of driving (not shown). The turret carries a lifting jib 9 comprised of several members telescopically connected and capable of being extended under the action of means of driving (not shown). At the extreme section 10 of the jib a pulley block 11 is suspended in a known manner, being fitted with a hook 12 or similar for suspending the load P.

The jib 9 is carried by the turret 7 by means of a frame 13 in relation to which it can swing around a horizontal joint 14 under the action of a luffing jack 15 acting between the turret 7 and the jib 9.

During a lifting operation, the crane has two parameters which define its geometric position, and various other parameters which define its conditions of operation. The parameters defining the geometric position of the crane are, for example, the angle which the jib 9 forms with the geographical horizontal or with the ground, and the length L of the jib, measured from the joint 14 to the extremity of the last section 10. The parameters defining the conditions of operation of the crane are, for example, the angular position of the turret 7 in relation to the chassis 2, the rest position on the ground 4 through the wheels 3 or the outriggers 5, 6, the addition to the extreme member 10 of a prolongation or a special lifting head (not shown), and the addition to the turret 7 of a supplementary counterweight.

It is desirable, if not imposed by the regulations, to know at all times if the load actually applied to the crane reaches its maximum permissible value or not, which is, for example, a fraction of the load causing overturning, this maximum permissible value depending upon the instantaneous geometric position of the crane, on the conditions of operation, and on the mechanical strength of the parts of the crane.

For this, in a known manner, a series of pre-determined values defining the geometric position of the appliance, is chosen arbitrarily from each of the two parameters, in order to form pairs of values, each comprising a value from each series.

In the application of FIG. 1, for example, six predetermined values $\alpha_0/\alpha_5$ for the angle $\alpha$, and nine predetermined values $L_0/L_8$ for the length L are chosen, to form 54 pairs of values ($\alpha$, L).

The values $\alpha_0/L_5$ and $L_0/L_8$ are chosen in order to cover the whole area of variation of angle $\alpha$ and length L during a lifting operation.

In the example shown, the values $\alpha_0/\alpha_5$ and $L_0/L_8$ are distributed regularly, but it is understood that they could be chosen in a different manner, for example in bringing these values closer to one another in the zones of operation most frequently used, so as to reduce the errors, as will be explained later.

Each of these pairs ($\alpha$, L) defines a geometric position of the crane, to which a reference value V, representing the maximum permissible load is assigned. This maximum permissible load is determined either as a function of the manufacturer's indications, or experimentally by the user, and it depends upon the lifting force of the crane, the conditions of operation, and the mechanical strength of the parts of the crane. In fact, for one pair ($\alpha$, L) of pre-determined values, that is to say for one geometric position of the crane, defined by the parameters $\alpha$, L, it is less stable when it rests on its wheels 3 than when it rests on the outriggers 5, 6, it is less stable longitudinally when it rests on its wheels, etc.

In FIG. 1, the pairs of pre-determined values are represented by points which are at the intersections of lines ($\alpha_0/\alpha_5$) passing through the joint 14, and of arcs of circle ($L_0/L_8$) centred on the joint 14. In the interests of clarity, the pairs are shown in the vertical plane passing through the longitudinal axis of the chassis 2, but it is understood that they each occupy any angular position around axis 8 of the turret 7, as a function of the angular position thereof.

The reference value assigned to a pair ($\alpha$, L) is designated by the latter V with two numerical indices, which are the indices of the values of angle $\alpha$ and of length L forming this pair. Only certain of these values are shown in FIG. 1. The reference value $V_{0,8}$ is assigned to the pair ($\alpha_0/L_8$), the value $V_{2,5}$ is assigned to the pair ($\alpha_2$, $L_5$), etc.

At all moments of a lifting operation, the actual instantaneous values $\alpha_i$ and $L_i$ are determined in a known manner by means which are described later with reference to FIG. 5, and the two consecutive values among the values $\alpha_0/\alpha_5$ and the two consecutive values among the values $L_0/L_8$ are selected, in the closed intervals of which, the values $\alpha_i$ and $L_i$ are respectively situated. By way of example, a pair of actual instantaneous values $\alpha_i$ and $L_i$ are shown in FIG. 1, which are respectively comprised between $\alpha_2$ and $\alpha_3$, and $L_5$ and $L_6$.

These two pairs of consecutive pre-determined values of $\alpha$ and L define four pairs and four reference values. In the example shown, the four reference values are $V_{2,5}$, $V_{2,6}$, $V_{3,5}$, and $V_{3,6}$.

Starting from these four reference values, a value $V_{i,i}$ representing the maximum permissible load for the geometric position of the appliance as defined by the values $\alpha_i/L_i$, and for the conditions of operation of the crane, is determined by three linear interpolations as a function of the position of the instantaneous actual values $\alpha_i$ and $L_i$ in relation to the values of the two pairs thus selected of consecutive pre-determined values of $\alpha$ and L.

Figure 2:
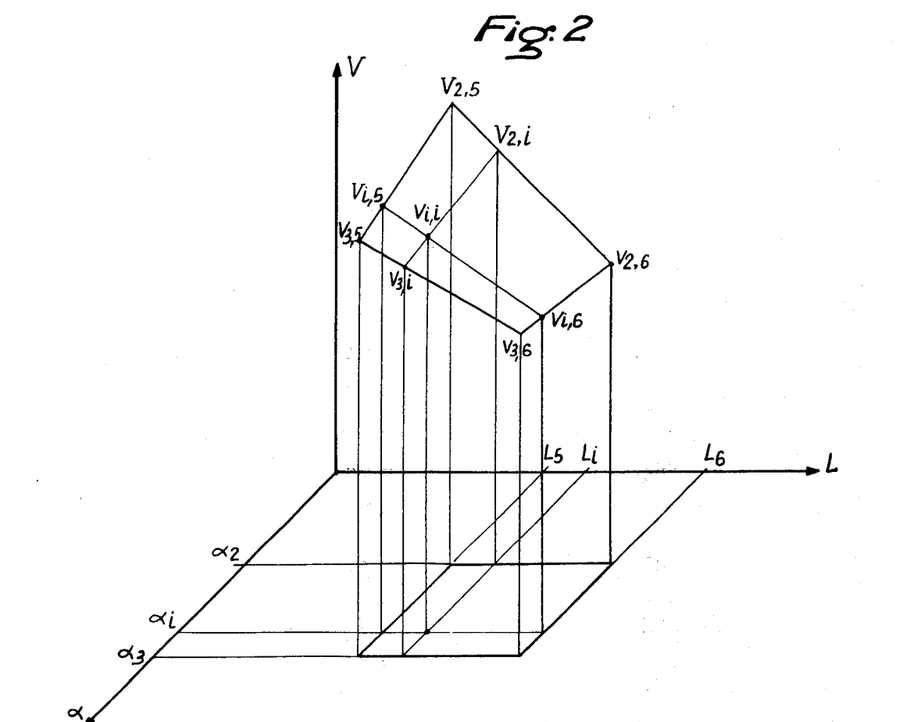
FIG. 2 is a geometrical representation of three interpolations effected in the device according to the invention.

FIG. 2 is a geometric representation of these three interpolations, in the example of FIG. 1, where $\alpha_i$ is comprised between $\alpha_2$ and $\alpha_3$, and $L_i$ is comprised between $L_5$ and $L_6$. A system of three perpendicular axes has been adopted, the values of $\alpha$ being plotted on the abcissa and the values of L on the ordinate, while the values of V, representing the maximum permissible loads, are plotted as shown.

A first value $V_{2,i}$ is established by linear interpolation between the values $V_{2,5}$ and $V_{2,6}$ as a function of the position of $L_i$ in relation to $L_5$ and $L_6$. This value $V_{2,i}$ represents the maximum permissible load for the geometric position of the crane defined by the values $\alpha_2$, $L_i$ of the parameters $\alpha$, L.

A third value $V_{i,i}$ is established by linear interpolation between the values $V_{2,i}$ and $V_{3,i}$ as a function of the position of $\alpha_i$ in relation to $\alpha_2$ and $\alpha_3$.

Thus, starting from the four reference values assigned to the four pairs defined by the two selected pairs of consecutive pre determined values of α and of L, a value $V_{i,j}$ is established by linear interpolation, representing the maximum permissible load for the geometric position of the crane defined by $α_i$ and $L_j$.

In the foregoing, the first interpolations have been effected by two pre-determined values of α, respectively $α_2$ and $α_3$, and the third interpolation has been effected for the instantaneous value $L_i$ of L. It is equally possible, as shown also in FIG. 2, to effect the first two interpolations for the two pre-determined values of L, respectively $L_5$ and $L_6$, in order to obtain values $V_{i,5}$ and $V_{i,6}$, and next to effect the third interpolation for the instantaneous value $α_i$ of α, in order to obtain the value $V_{i,i}$ which is equal to the value of $V_{i,i}$ previously established.

Simultaneously with the establishment of the value $V_{i,i}$ a fourth value $V_p$, representing the load actually applied to the crane is established in a known manner, the values $V_{i,i}$ and $V_p$ are compared and information is given out, which represents the load actually applied in relation to the maximum permissible load defined by $V_{i,i}$, in order to control an alarm signal or the stopping of the crane if this maximum load is reached or exceeded. In order to permit this comparison, the relation numerical value/load is the same for the numerical reference values and for the fourth numerical value. For preference, this relation in linear.

Figure 3:
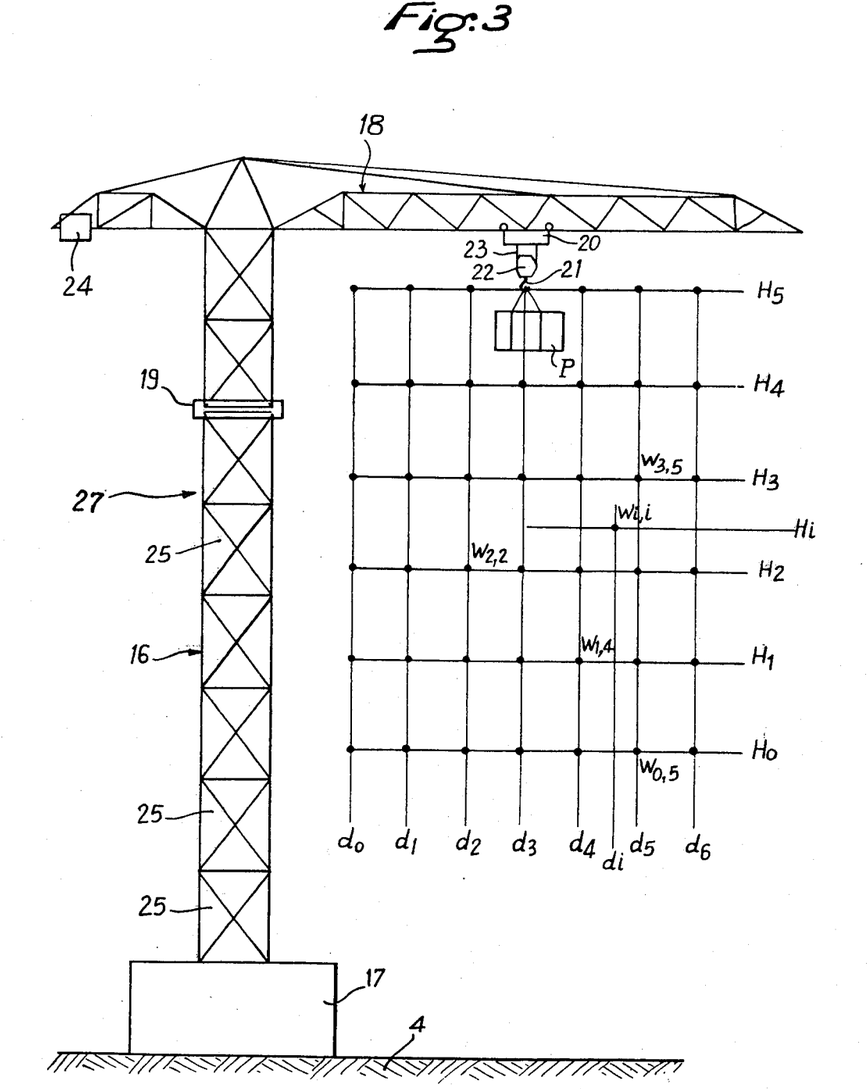
FIG. 3 is a view analogous to FIG. 1 and relating to the application to a shipyard crane, of the type comprising a vertical column and a horizontal jib.

In FIG. 3, the application of this proceedure is shown for a crane of another type. The crane 27 comprises a column 16 resting on the ground 4 through a foundation 17, and a horizontal jib 18 able to pivot round the vertical axis of the column by a joint 19. The jib carries on one side of the column a carriage moveable along the jib and carrying a hook 21 and pulley block 22 by a cable 23. On the other side of the column 16, the jib carries a counterweight 24.

The two parameters defining the geometric position of the crane are the height H of the jib 18 in relation to the ground and the distance "d" of the carriage 20 from the axis of the column 16. The height H is defined by the number of superimposed sections 25 in order to form the column, while the distance "d" is defined by the position of the carriage on the nib 18. The parameter H varies in a discontinuous manner, and in the same condition of lift it is constant, while the parameter "d" varies in a continuous manner during the lifting operation.

A series of values $H_0/H_5$ of H and a series $d_0/d_6$ of "d" are chosen in order to create, in the example under consideration, 42 pairs of values (H, d).

For preference, the heights $H_0/H_5$ correspond to the heights of the jib 18 when the column 16 comprises respectively one to six sections.

As before, a reference value representing the maximum permissible load for the geometric position of the crane as defined by the said pair of values (H, d) and for the conditions of operation, is assigned to each of the pairs. By way of example, some values $W_{0.5}$, $W_{1.4}$, $W_{2.2}$, and $W_{3.5}$ are shown in FIG. 3.

For the instantaneous geometric position for the crane, defined by the values $H_j$, $d_i$, reference values W are determined in a similar manner, in relation to which the three linear interpolations are effected in order to obtain the value $W_{i,i}$ representing the maximum permissible load for this geometric position.

A value $W_p$ representing the load P actually applied to the crane is established, the values $W_p$ and $W_{i,i}$ are compared, and the information is given, which represents the load actually lifted in relation to the maximum permissible load defined by the value $W_{i,i}$.

Although two modes of application of the known process have been given, it is understood that it can be applied to various types of lifting appliance, in which the values of the two parameters have an effect on their capacity.

Figure 4:
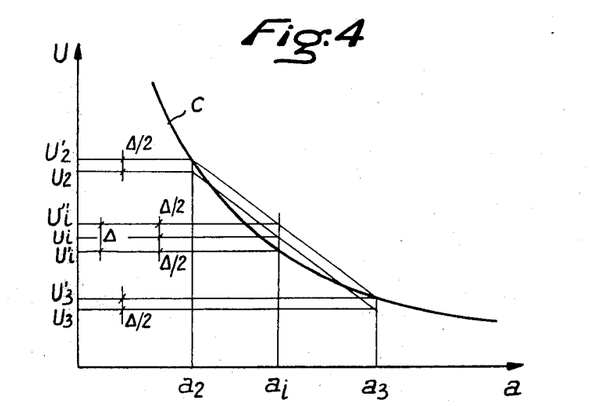
FIG. 4 is a diagram illustrating the choice of reference values in order to reduce the errors due to the interpolations.

FIG. 4 shows the manner of choosing the reference values representing the maximum permissible loads, in order to reduce the errors due to the interpolations.

Curve C represents the reference values U defined from the manufacturer's data for the values of a parameter "a". By way of example, two pre-determined values $a_2$ and $a_3$ of the parameter "a" have been taken, to which correspond, for a pre-determined value of another parameter, two values $U_2'$, $U_3'$, defined by the curve C. This curve C is concave, such that between $a_2$ and $a_3$ a value $a_i$ exists, for which the error Δ between the value U" defined by the linear interpolation and the value $U_i'$ defined by curve C, is a maximum. In order to reduce this error, reference values $U_2$ and $U_3$ are assigned to the values $a_2$ and $a_3$ of parameter "a", These reference values differing by Δ/2 from $U_2'$ and $U_3'$, such that the maximum error between $a_2$ and $a_3$ is Δ/2.

In order to again reduce the error introduced by each interpolation, the pre-determined values for the parameter can be brought closer together, but this is rapidly limited by the number of values thus selected.

Figure 5:
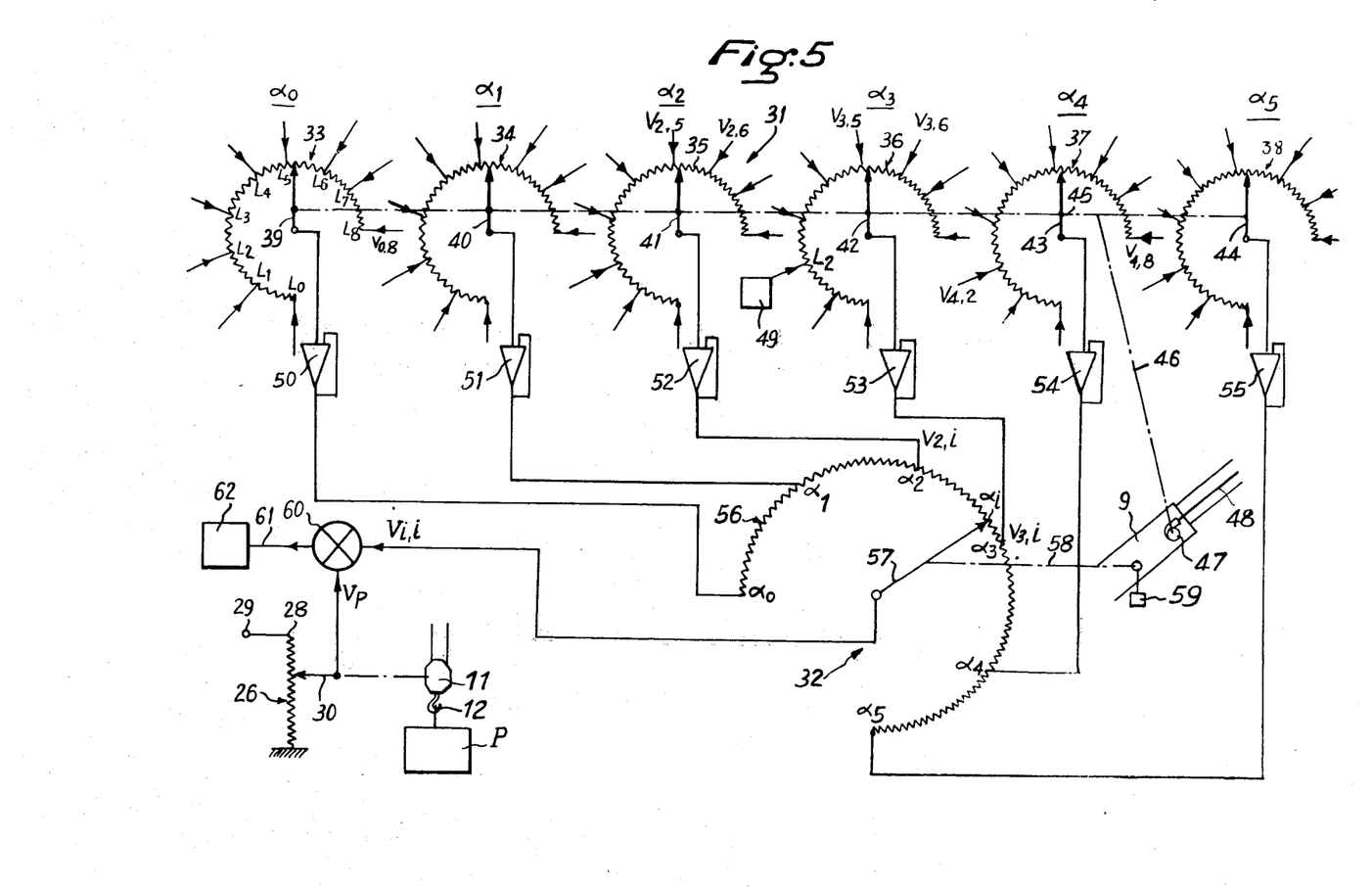
FIG. 5 is a general electrical diagram of the system of two potentiometer units to which the invention applies.

FIG. 5 shows a device in essential, used for carrying out the proceedure described above. This device is designed, by way of example, for use with the crane in FIG. 1.

In order to effect the three interpolations mentioned above, two potentiometer units are used.

Unit 31 comprises as many potentiometers as there are chosen pre-determined values of the parameter, that is six potentiometers 33/38, respectively corresponding to the six values $α_0/α_5$ of α. All these potentiometers are alike. They each have as many tappings as the chosen number of pre-determined values of parameter L, that is nine tappings respectively, corresponding to the nine values of $L_0/L_8$ of L. By way of example, the nine pre-determined values of $L_0/L_8$ of L associated with the nine tappings of potentiometer 33, are shown in FIG. 5, the potentiometer itself correspin­g to $α_0$. There are thus 54 tappings on the six potentiometers, which represent the 54 pairs (α, L) of FIG. 1. The arms 39/44 of these potentiometers are mechanically coupled together, as shown by the chain-dotted line 45, and their position is controlled by the instantaneous actual value L of the length of the jib 9, as shown by chain-dotted line 46.

Measurement of the value L is in any known manner, for example, by a winding drum 46 with a cable 48 acting between the first member and the extreme member 10 (FIG. 1) of jib 9. The displacement of the arms 39/44 thus varies linearly with length L.

Thus, at any moment in a lifting operation, the arms 39/44 on the respective potentiometers occupy the same position defined by the instantaneous value $L_i$. In the example shown in FIGS. 1 and 5, the value $L_i$ is between $L_5$ and $L_6$. On each of the potentiometers 33/38, the geometric distribution of the tappings associated with the values $L_0/L_8$ is the same as the numerical distribution of these values. In general, the values $L_0/L_8$ are regularly spaced, and in consequence, the nine tappings are regularly spaced on each potentiometer.

Reference voltages are assigned to the 54 tappings of the potentiometers, representing the maximum permissible loads for the corresponding values of α and L. Some of those voltages are shown on FIG. 5. These polarisation voltages are established for each potentiometer tapping, by a suitable system 49 according to the invention, only the system 49 of the tapping which corresponds to the values $\alpha_3$, $L_2$ being shown in FIG. 5. The system 49 will be described later in detail with reference to FIG. 6.

The arms 39/44 are electrically connected through an interface formed by respective operational amplifiers 50/55, to the six tappings of a single potentiometer 56 which forms the potentiometer unit 32. The six tappings of potentiometer 56 correspond respectively to the values $\alpha_0/\alpha_5$ of angle α. The position of arm 57 of potentiometer 56 is controlled, as shown by the chain-dotted line 58, by the actual instantaneous value $\alpha_i$ of angle α. The geometric distribution of the tappings of potentiometer 56 is the same as the numerical distribution of the values $\alpha_0/\alpha_5$, in general regularly spaced.

Measurement of angle $\alpha_i$ is in any known manner, for example by a pendulum system 59 associated with the jib 9, which gives a displacement of arm 57 varying linearly with angle α.

The arm 57 is electrically connected to the input of a comparator 60.

A numerical value $V_p$ is established, representing the load P actually applied to the crane. For this, a potentiometer 25 is shown diagrammatically, of which one terminal 28 is connected to a voltage source 29, the other terminal being earthed, and the position of the potentiometer arm 30 is controlled by the load P Arm 30 is electrically connected to the other input of comparator 60. For preference, in order to produce the value $V_p$, the device described in French Patent No. 74 24304, deposited July 12, 1974, is used, in the name of the applicant.

The outlet 61 of the comparator 60 controls an operation circuit 62, which serves to control an alarm signal or stop the crane.

Figure 6:
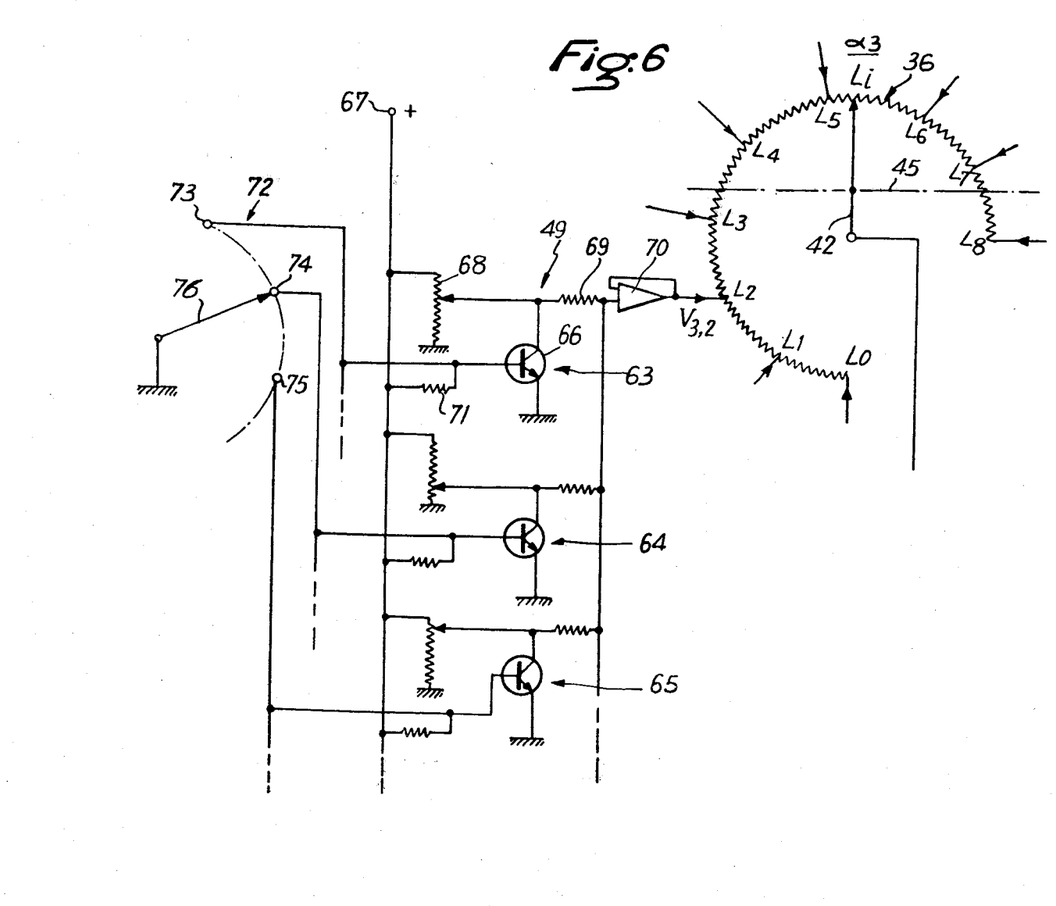
FIG. 6 is an electrical diagram of the device according to the invention for establishing the reference voltages.

The system of polarisation 49, according to the invention, will now be described with reference to FIG. 6. This system enables the reference voltage to be assigned to the corresponding tapping. In the example chosen, this voltage is $V_{3,2}$, representing the maximum permissible load for the geometric position of the crane defined by the values $\alpha_3$ and $L_2$ of parameters α and L.

As shown previously, this reference voltage depends, for the same values of α and L, upon the conditions of operation. For this reason, the system 49 comprises several circuits, each corresponding to a parameter defining a condition of operation. By way of example, three parameters of operating conditions have been selected, to which three switchable circuits 63, 64 and 65 correspond. Circuit 63 corresponds to the rest position of the crane 1 on the ground 4 through the outriggers 5,6. Circuit 64 corresponds to the rest position of the crane on the ground by its wheels 3 and to a position of the vertical plane of the jib 9 at a maximum of 15° from one side to the other of the longitudinal axis of the chassis 2, and circuit 65 corresponds to the rest position of the crane on the ground by its wheels and to a position of the said vertical plane beyond the angle of 15°.

Circuits 63, 64 and 65 are similar, and for this reason circuit 63 only will be described. This circuit comprises a member 66 supplying a controlled voltage, for example a transistor whose emitter is earthed and whose collector is connected to a D.C. voltage source 67 through a controllable polarisation resistance 68. The collector is connected to the corresponding tapping of potentiometer 36 through a resistance 69 and an operational amplifier 70. The base of the transistor 66 is connected to source 67 through a resistance 71 and a switch member 72 which selects the one of the circuits 63, 64 or 65 which is to be energised as a function of the conditions of operation.

Circuits 63, 64 and 65 are arranged in parallel between source 67 and the input of the operational amplifier 70. The bases of the transistors 66 are respectively connected to the outlets 73, 74, 75 of the switch member 72.

The switch is shown in the form of a manual switch with several positions, comprising a moveable contact 76 connected to earth in order to block those of transistors 66 of which the base is connected to contacts 73, 74 or 75, selected by the position of the moving contact 76.

For initial determination of the reference voltage $V_{3,2}$ in the example under consideration, contact 76 is successively moved to each of the positions 73, 74 and 75, and for each position, the corresponding resistance 68 is adjusted in order to obtain on the collector of the associated transistor 66 a voltage suitable for supplying the desired voltage $V_{3,2}$ through resistance 69, which represents the maximum permissible load for the values $\alpha_3$, $L_2$, and for the conditions of operation of the crane defined by the switch member. The relation between this reference voltage and the load which it represents is the same as the relation between voltage $V_p$ and the load which it represents. In general, these relations are linear.

According to the invention, as many reference voltages are available with system 49 as there are conditions of operation to be considered.

As shown by dashes, contacts 73, 74 and 75 of switch 72 control the bases of transistors 66 respectively of circuits 63, 64 and 65 of the fifty-four polarisation systems 49.

Although the switch member 72 is shown in the form of a manual switch, it is understood that switching can be automatic by control from the outriggers 5, 6 and by the passage of the jib 9 beyond the 15° position mentioned above.

The function of the operational amplifier 70 associated with each polarisation system 70, according to the invention, is to maintain constant reference voltage applied to the corresponding tapping of the potentiometer, such as 36, when the reference voltage is varied or established on another tapping of the same potentiometer.

To use the system according to the invention, the operator has no other movement to make than to operate switch 72 if it is automatic. The system according to the invention, due to its construction, is not very sensitive to external conditions. It is therefore reliable. Furthermore, as it is relatively simple, it is attractive in cost. An important advantage of this system is that it can be applied to various types of appliance without modification of the appliance or of the devices themselves.

The invention can be applied to crane type appliances which have an overturning moment, as well as to lifting appliances of the portal type and to overhead travelling cranes.

I claim:

1. A device for enabling the load on a lifting appliance to be controlled, comprising a first potentiometer unit formed by a series of potentiometers, each having multiple tappings and a movable contact arm, means for mechanically coupling together the arms of said potentiometers, first means for controlling the position of the arms of the said potentiometers as a function of the value of a first geometric parameter of the appliance, a second potentiometer unit comprising a potentiometer having multiple tappings and a movable contact arm, each tapping being electrically connected to the arm of a corresponding potentiometer of the first unit, a second means for controlling the position of the arm of the said second unit potentiometer as a function of the value of a second geometric parameter of the appliance, third means serving to assign reference voltages to the tappings of the potentiometers of the first unit, fourth means serving to establish a voltage representing the instantaneous load actually applied to the appliance, fifth means serving to compare the voltage taken from the arm of the second unit potentiometer and the said voltage representing the load applied to the appliance, said third means including for each tapping, a system of polarisation comprising a series of polarisation circuits in parallel, associated with the position in which the appliance is brought into operation, each circuit having a member suitable for providing a regulated voltage and controlled by a switching device defining the instantaneous position of operation and simultaneously controlling all the circuits of all the systems of polarisation of the tappings of the first unit potentiometers.

2. A device according to claim 1, wherein the member suitable for providing a regulated voltage is a transistor whose base is controlled by the said polarisation device.

3. A device according to claim 1 wherein, between each system of polarisation and its associated tapping, and between the arm of each first unit potentiometer and the associated tapping of the second unit potentiometer, an operational amplifier is provided, which is adapted to maintain constant the voltage applied to the corresponding potentiometer tapping if the voltage applied to another tapping of the same potentiometer is changed.

* * * * *